April 23, 1929.     A. L. MOLER     1,710,101
GREASE CELLAR
Filed May 21, 1927
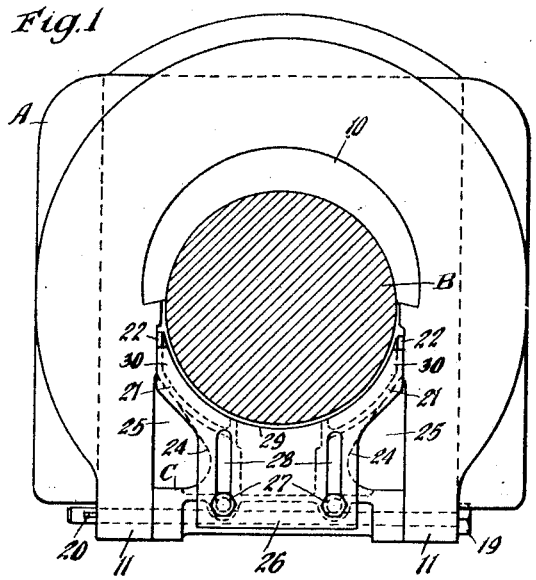
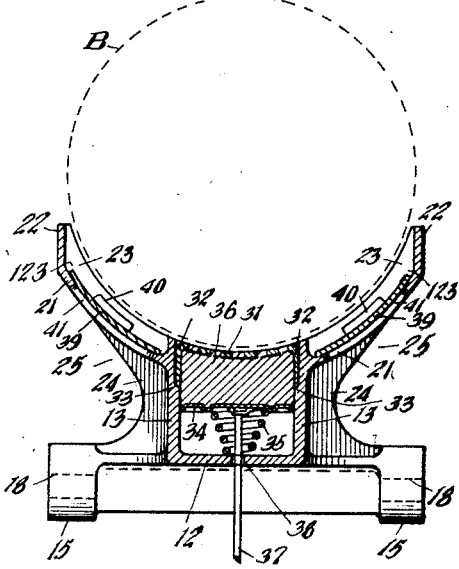
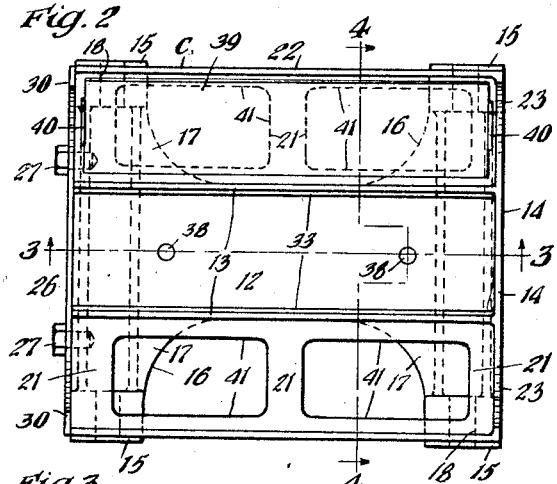
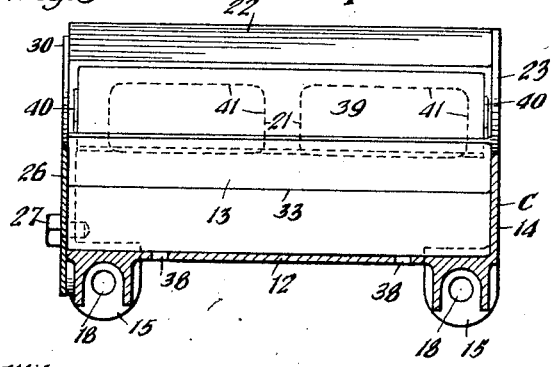
Witness
Wm. Geiger
Inventor
Abraham L. Moler
By George I. Haight
His Atty.

Patented Apr. 23, 1929.

1,710,101

UNITED STATES PATENT OFFICE.

ABRAHAM L. MOLER, OF RICHMOND, VIRGINIA, ASSIGNOR OF ONE-HALF TO JOHN W. SMALL, OF RICHMOND, VIRGINIA.

GREASE CELLAR.

Application filed May 21, 1927. Serial No. 193,295.

This invention relates to improvements in grease cellars.

Heretofore, in the lubrication of journals of locomotives, it has been the general practice to use a grease cellar having a single wide chamber from which the grease or other lubricant is dispensed. In such cellars a perforated dispensing plate is employed to bear against the under portion of the journal and curved to conform therewith, the chord of the arc of such dispensing plate and the width of the chamber in which the plate moves corresponding approximately to the usual width between the jaws of the driving box. Such types of grease cellars have proven unsatisfactory in many instances for the reasons that a necessarily large amount of lubricant is used and there is no adequate provision for cooling of the grease cellar or the journal. Furthermore, such types of cellars possess the further disadvantage that there are no means provided for collecting and removing the waste or used grease without removing the grease cellar as an entirety.

One object of my invention is to provide a grease cellar especially adapted for locomotive driving boxes, which is economical to manufacture, light in weight, provided with an efficient arrangement for keeping the cellar and journal cool; and which is additionally equipped with a simple arrangement for collecting the used or waste lubricant and for removing the latter without the necessity of removing the cellar from the driving box.

More specifically, an object of my invention is to provide a grease cellar having a relatively narrow grease-dispensing chamber and relatively shallow side chambers to collect the waste grease, said collecting chambers being provided with readily removable grease collecting means whereby said means may be taken out, the used grease removed therefrom and said means restored without taking down the cellar.

Other and further objects of the invention will more clearly appear from the description and claims hereinafter following.

In the drawing forming part of this specification, Figure 1 is an inside elevational view of a locomotive driving box showing my improvements in connection therewith, the journal being shown in section. Figure 2 is a top plan view of my improved grease cellar shown detached from the driving box, the removable plate or pan in one of the shallow collecting chambers being omitted to more clearly illustrate certain parts of the grease cellar proper. Figure 3 is a vertical, sectional view corresponding substantially to the line 3—3 of Figure 2. And Figure 4 is a transverse, vertical sectional view corresponding substantially to the line 4—4 of Figure 2.

In said drawing, A designates a locomotive driving box such as commonly employed on many locomotives; B indicates the usual journal; and C, my improved grease cellar proper.

The driving box A, as illustrated, is provided with the usual brass 10 and depending side jaws 11—11, spaced apart slightly more than the diameter of the journal B and between which jaws the improved grease cellar C is adapted to be inserted and retained in position.

The improved grease cellar C, as shown, preferably consists of a casting having a relatively narrow, horizontal bottom wall 12, from which extend upwardly, vertical side walls 13—13 and an integral vertical end wall 14 on the outer end of the cellar. The end wall 14 has its upper edge curved to conform to the curvature of the journal and side walls 13 extend to a point approximately in contact with the journal. At the bottom, the casting is provided with four corner lugs 15—15, spaced apart longitudinally of the cellar, as clearly illustrated in the plan view in Figure 2 so as to provide openings or recesses 16 on each side of the side walls 13, the lugs being united with the central portion of the casting by webs 17—17. The four corner lugs 15 are apertured as indicated at 18—18, so as to receive retaining bolts 19 which are extended through aligned openings in the depending jaws of the driving box so as to secure the grease cellar in place as clearly evident from Figure 1. The bolts 19 may be retained in place by suitable cotters 20.

Formed integrally with the side walls 13 and extending laterally from each, is an arcuate web section 21 on each side of the casting, the curvature of which corresponds approximately to the curvature of the journal and is spaced a short distance therefrom as clearly shown in Figure 4. The upper edges of the webs 21 are extended vertically as indicated at 22 so as to fit against the jaws of the driving box and thereby assist in retaining the grease cellar in place. At the outer end of the cellar, integral end walls 23 are provided which, together with the sections 22 and webs 21 and the uppermost portions of the side walls 13, form shallow side chambers for the purpose hereinafter described. The said side chambers are further integrally connected with the remainder of the casting by vertical web reinforcing sections 24—24 of comparatively narrow width so as to leave spaces 25—25 at each side of the cellar within the vertical planes defined by the outermost portions of the sides of the casting for the purpose hereinafter described.

A movable or displaceable end plate 26 is secured to the inner end of the grease cellar casting, this being accomplished preferably by two bolts or screws 27—27 threaded into the main casting and which pass through vertically elongated slots 28—28 in the plate 26. The plate 26 is of generally rectangular outline in its lower portion and at its upper portion has the edge thereof made arcuate as indicated at 29 to conform approximately to the curve of the journal and side arms 30—30 are provided for the plate to close or cover the ends of the side chambers 23. It will be noted from an inspection of Figure 1 that the plate 26 is of such contour that the spaces 25 at each side of the casting are open at the ends of the grease cellar and of the driving box so that air may have access to said spaces in a direction lengthwise of the grease cellar.

The bottom wall 12, side walls 13, integral end wall 14 and plate 26, together constitute a central chamber from which the grease or other lubricant is adapted to be dispensed. This chamber, as clear from an inspection of Figure 4, is relatively narrow. In the central dispensing chamber is provided a perforated grease dispensing plate 31, the upper main portion of which is curved to conform to the journal and has depending side flanges 32—32 slidably guided by the inner faces of the side walls 13, the latter preferably being rabbeted or recessed at their upper portions, thus forming shoulders 33 to limit the downward movement of the plate 31 as will be evident.

Also disposed in the central chamber is a follower plate 34 adapted to be yieldingly pressed upwardly by two or more coil springs 35 interposed between the plate 34 and the bottom wall of the casting. A cake of grease as indicated at 36 is interposed between the follower plate 34 and the dispensing plate 31 so that the grease cake will be pressed upwardly against the plate 31 and the latter, in turn pressed against the journal. Telltales 37 may be attached to the follower plate 34 and extended downwardly through suitable openings 38 in the bottom wall of the casting so as to indicate the thickness of the grease cake at any time without necessity of taking down the cellar. The telltales also are used to pull down the follower plate when renewing the grease cake.

Provided in each of the side collecting chambers 23 is a removable plate or pan 39, of curved form, to correspond with the curvature of the bottom wall of the side chamber and of a width approximating the distance between the vertical sections of the casting which define the side chamber. Said plate or pan 39 is of an area corresponding to the bottom area of the side chamber and, at each end, is preferably provided with an upstanding lip or flange 40—40.

By loosening the bolts 27, it is obvious that the end plate 26 may be dropped down without actually detaching it from the cellar casting and, in this position of the plate 26, a new grease cake may be inserted or the old one taken out and, likewise, pans or collecting plates 39 may be inserted or removed, without the necessity of taking down the grease cellar as an entirety.

By making the central dispensing chamber relatively narrow, the lubricant is applied over a much narrower area than has heretofore been the general practice and experience has demonstrated that a much more economical use of grease is thereby accomplished. Furthermore, the narrow central chamber leaves relatively large spaces on each side of the casting which, in combination with the longitudinally spaced corner lugs 15, permits of ample air circulation vertically on each side of the central chamber, this circulation being augmented by the provision for longitudinal air circulation as hereinbefore referred to, thus bringing the air against the bottoms of the shallow side chambers and hence to a point closely adjacent the journal to thereby provide for effective cooling of the latter.

The grease is dispensed from the central chamber in the manner heretofore indicated, and depending upon the manner of rotation of the journal, the used or waste or carried over grease is collected in either or both of the shallow side chambers and on the pans 39. When it is desired to clean out the waste grease, it is only necessary to lower the end plate 26, pull out the pans 39, scrape them off and return them to position, which obviously can be done in a very short time and with very little labor.

To lighten the casting, the bottom walls or webs 21 of the side chambers may be provided with enlarged openings 40—41, which openings will obviously be covered by the pans 39 when the latter are in place.

From the preceding description, considered in connection with the drawing, it will be seen that I have provided a light, self-cooling cellar with provision for economical dispensing of the lubricant and with simple and convenient means for maintaining the proper condition of the cellar at all times without the necessity of removing the cellar from the driving box.

I have herein shown and described what I now consider the preferred manner of carrying out my invention, but the same is merely illustrative and I contemplate all changes and modifications that come within the scope of the claims appended hereto.

I claim:

1. A lubricating cellar for locomotive driving boxes comprising: a member having a chamber in which the lubricant to be dispensed is adapted to be contained and a separate chamber therefrom; and removable means in the last-named chamber forming a part of said chamber and adapted to collect the used lubricant whereby used lubricant may be removed by removing said means from the cellar.

2. A lubricating cellar for locomotive driving boxes comprising: a member having a chamber in which the lubricant to be dispensed is adapted to be contained; and a separate chamber, said chamber being open at one end; removable means disposed in said last named chamber for supporting lubricant collected in said chamber, said means being endwise removable through said opening; and displaceable means at one end of the cellar for closing said opening and retaining said first named means in position.

3. A lubricating cellar for locomotive driving boxes comprising: a member having a central chamber and two side chambers, one on each side thereof; and removable means in each of said side chambers and forming a part thereof on which the waste lubricant is adapted to be collected and removed from the cellar.

4. A grease cellar for locomotive driving boxes comprising: a member having a central-grease-dispensing chamber and two side collecting chambers each open at one end; removable means in each of said side chambers on which the waste grease is adapted to be collected, said means being removable through the open end of each of said chambers; and displaceable means at one end of said chamber for closing said openings and retaining said first named means in place.

5. A grease cellar comprising a casting having a relatively narrow central chamber defined by side walls, a bottom wall and end walls and two integrally formed shallow side chambers extending in a general direction laterally and upwardly from the upper parts of said side walls of the central chamber, the bottom walls of said side chambers having openings therein, removable means for closing said openings, said removable means forming a support for collecting the lubricant the cellar having spaces at each side of the central chamber to thereby permit circulation of air therein when the cellar is in place in the usual driving box.

6. A grease cellar for locomotive driving boxes comprising: a casting having a relatively narrow central, dispensing chamber and relatively shallow side collecting chambers; removable grease collecting pans in said shallow side chambers, one set of ends of said central and side chambers being open; and a displaceable end plate attached to said casting and adapted to close the ends of said chambers and thereby retain said pans in position.

7. A grease cellar for locomotive driving boxes comprising: a casting having four corner lugs arranged in pairs spaced longitudinally; a central chamber integrally formed therewith and defined by a bottom wall and vertical side walls and an integral end wall; and relatively shallow side chambers defined by integrally formed sections, the casting being provided with spaces on opposite sides of said central chamber; collecting plates, one in each of said side chambers; and a plate movably attached to one end of said casting and adapted to close the adjacent ends of said central and side chambers, said plate being of restricted width at its lower portion.

In witness that I claim the foregoing I have hereunto subscribed my name this 17th day of May, 1927.

ABRAHAM L. MOLER.